INVENTOR
E. J. HUME
BY Young, Emery & Thompson
ATTYS.

United States Patent Office 2,800,258
Patented July 23, 1957

2,800,258

FEEDING OF DISCRETE OR FINELY DIVIDED MATERIALS FROM A RELATIVELY LOW PRESSURE CONTAINER

Ernest Jeremy Hume, Carnegie, Victoria, Australia, assignor to Humes Limited, Melbourne, Victoria, Australia, a company of Victoria Application December 19, 1955, Serial No. 554,051

Claims priority, application Australia December 30, 1954

4 Claims. (Cl. 222—481)

This invention relates to the feeding or delivery of discrete materials such, for example, as powder, granulated, pulverised or finely divided substances from a relatively low pressure bulk container, e. g., a container subjected to suction effect or sub-atmospheric pressure, into a container or vessel in which a substantially higher pressure obtains, or to a discharge point or zone which is subject to such higher pressure or to atmospheric pressure.

Conditions of that nature apply in many fields of industry and manufacture and merely by way of example may be mentioned the feeding of flux powder as used in electric welding from a low pressure hopper or container to the actual welding zone.

The primary object of this invention is to provide a simple and effective device for facilitating the discharge of the discrete material from the low pressure container so that a regular discharge thereof into a higher pressure zone can be assured without permitting any material increase of pressure in the container.

The invention is illustrated in the accompanying drawings as applied to a low pressure hopper suitable for feeding flux powder to the welding zone of an electric welding system, such as disclosed in copending application Serial No. 553,938, filed December 19, 1955. In these drawings.

Figure 1:
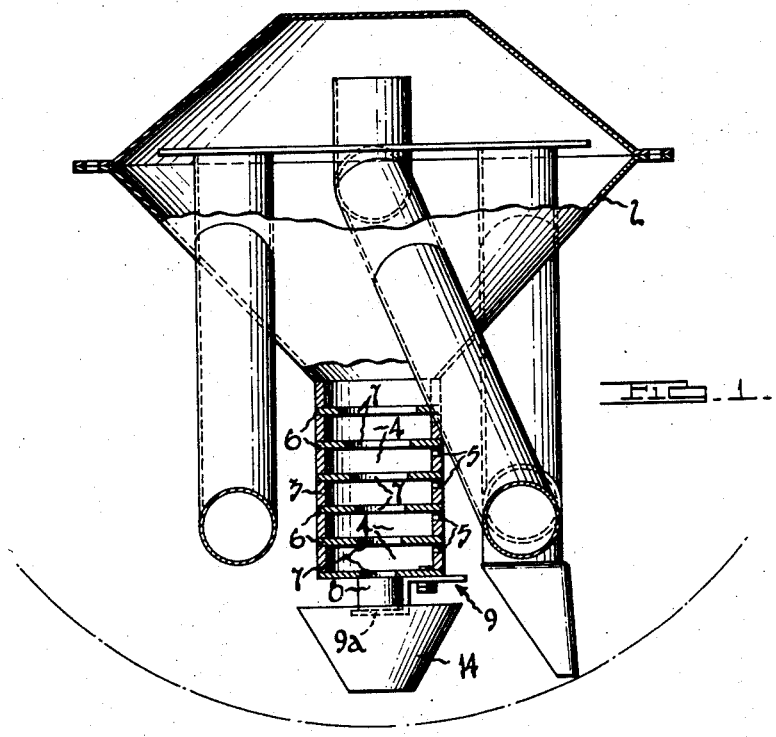
Figure 1 is a part sectional elevation showing the device connected to the lower end of the hopper.
Figures 2, 3:
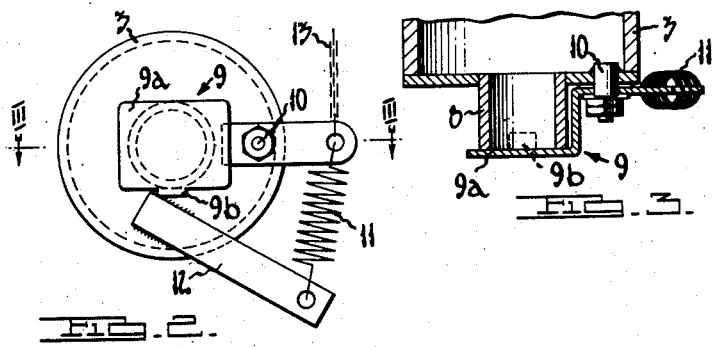
Figure 2 is an inverted plan view on a larger scale of a regulating or cut off device at the bottom of the control device.
Figure 3 is a cross section on the line III—III of Figure 2 looking in the direction of the arrows.

Referring to the drawings, it will be seen that the relatively low pressure container 2 is provided at its lower end with the discharge device comprising a casing 3, the interior of which is divided into a series of superposed compartments 4 which have restricted communication with each other at or about the centre and each of which is provided in its outer wall with a relatively small aperture 5 or a number of small apertures each of which is subject to atmospheric pressure or a pressure which is higher than that obtaining in the container. These relatively small apertures should be located as near to the tops of the respective compartments as practicable.

The compartments are formed by horizontal partitions 6 each having an opening 7, preferably centrally disposed, for the downward flow of the powder or like material. Where the casing is of cylindrical shape the openings 7 would preferably be circular in plan. They may be of uniform area but preferably decrease progressively in area from the uppermost partition to the lowermost partition.

The number and size of the compartments may vary in accordance with the circumstances, such as the nature of the particular material being dealt with, its volume and desired rate of feed or discharge, and the difference in pressure obtaining in the upper part of the container and the final discharge point or zone.

For example, in delivering a supply of powdered flux to the welding zone in an electric welding system six compartments have been found to be adequate.

A delivery spout 8 may project downwardly from the bottom of the casing, which also has a central opening 7, and may be fitted with a valve, regulator or like member that will enable the rate of discharge to be controlled and to be cut-off as and when desired.

This regular may include a plate member 9 attached by a pivot pin 10 to the bottom of the casing 3 and terminating at one end in a portion 9a which may extend completely across the bottom of the spout 8 and thus cut off discharge of the material. The plate member may be resiliently urged towards the closed position by a spring 11 extending between the other end of the plate member and a bar 12 affixed to the bottom of the casing, the plate member 9 having a spur 9b which acts as a stop for the closed position. A chain 13 or other flexible line may extend from the plate member to any position convenient to the operator in charge of the apparatus.

In use, it will be found that the material will gravitate successively into the compartments 4 and tend to assume in each compartment the form of a truncated conical mass depending to some extent upon the angle of repose of the material. The admission of air at atmospheric pressure through the small holes in the upper parts of the compartments has the effect of gradually increasing the pressure within the successively lower compartments so that by the time the central core of material, which gravitates without impedance, reaches the delivery spout the difference in pressure will be overcome so that a steady discharge will take place without any significant rise in pressure within the upper part of the container.

In Figure 1 of the drawings, the delivery spout 8 is encircled by a funnel like member 14 which is suitable when applying the invention to the feeding of flux powder to the welding zone of an arc welding system, but this is merely an example of one pracitcal application of the invention.

Having now described my invention what I claim as new and desire to secure by Letters Patent is:

1. A device for facilitating the discharge of discrete material such as powder or finely divided solid particles from a relatively low pressure container into a space that is subject to higher or atmospheric pressure, comprising the container and a casing depending from the bottom of said container, horizontal partitions in said casing subdividing its interior into a series of superposed compartments, each of said partitions and the bottom of the container having a central unobstructed opening so that the material will gravitate successively and freely into the compartments and tend to assume in each compartment the form of a truncated conical mass of solid particles, and the wall of said casing being provided near the top of each compartment with at least one relatively small aperture subject to atmospheric pressure, which is higher than that obtaining within the container, to gradually increase the pressure within the successively lower compartments so that by the time the central core of material reaches the bottom opening the difference of pressure will be overcome resulting in a steady discharge of material without a significant rise in pressure within the container.

2. A device according to claim 1, wherein each opening is of lesser area than the opening immediately above it.

3. A device according to claim 2, in which the casing is of cylindrical form and the openings in the partitions are of circular shape.

4. A device according to claim 3 in which the casing is provided at its bottom with a regulator enabling the rate of discharge to be varied and to be cut off as and when desired.

References Cited in the file of this patent

UNITED STATES PATENTS

| | | |
|---|---|---|
| 2,441,724 | Simpson | May 18, 1948 |
| 2,556,655 | Lane | June 12, 1951 |
| 2,626,235 | Wilson | Jan. 20, 1953 |
| 2,670,011 | Bertin et al. | Feb. 23, 1954 |